Nov. 3, 1936.  A. C. FLAVIN ET AL  2,059,636
STRAINER
Filed July 17, 1936    2 Sheets-Sheet 1
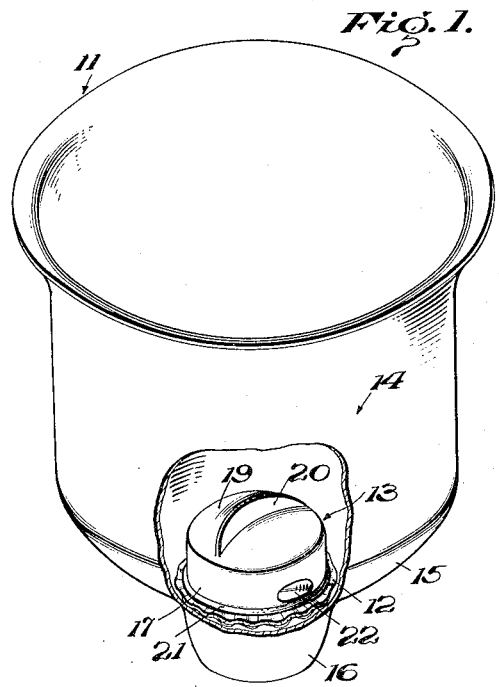
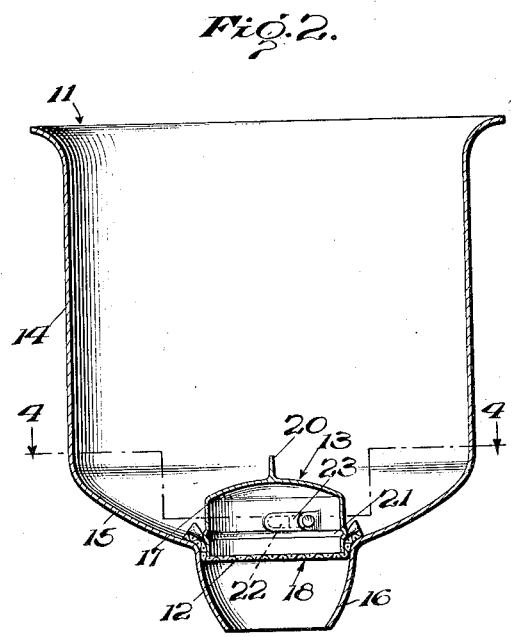
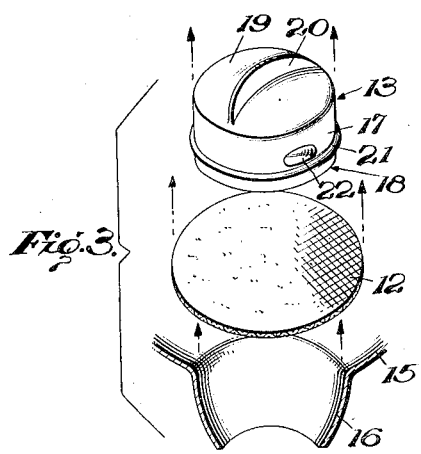
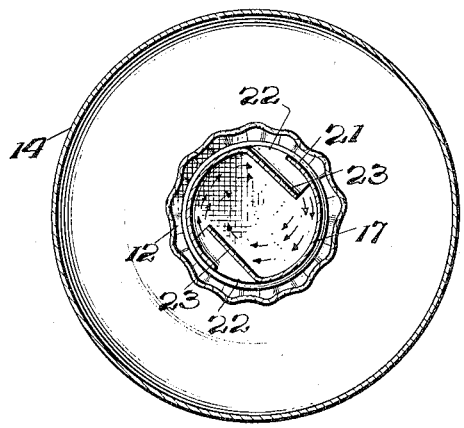
Inventors
Arthur C. Flavin
William B. Flavin
By Thomas M. Flavin
Cameron, Kerkam & Sutton
Attorneys Nov. 3, 1936.  A. C. FLAVIN ET AL  2,059,636

STRAINER

Filed July 17, 1936  2 Sheets-Sheet 2

Inventors
Arthur C. Flavin
William B. Flavin
Thomas M. Flavin
By Cameron, Kerkam & Sutton
Attorneys Patented Nov. 3, 1936

2,059,636

UNITED STATES PATENT OFFICE 2,059,636

STRAINER

Arthur C. Flavin, Evans Mills, Thomas M. Flavin, Gouverneur, and William B. Flavin, Evans Mills, N. Y., assignors to R. J. Hamilton, Jr., Pittsburgh, Pa.

Application July 17, 1936, Serial No. 91,216

12 Claims. (Cl. 210—159)

This invention relates to devices for straining or filtering fluids so as to remove therefrom foreign and undesirable substances, and more particularly to strainers or filters of the type in which the fluid is strained by passing it through a filtering membrane of cloth or other suitable material.

Although the strainer of the present invention is capable of filtering any and all fluids, it finds particular usefulness in connection with the removal from milk of sediment, scum, garget, dirt, hair and other foreign matter which may be present in the milk but must be removed therefrom before it can be bottled or otherwise made ready for human consumption. Since a number of the States have relatively strict laws governing the straining of milk, it is extremely important that there be available to the farmer or dairyman a stainer of simple construction which will fully comply with the most rigid sanitary regulations and will yet filter milk quickly and efficiently. The strainer herein disclosed is particularly well adapted to fulfill this need. At the same time, its construction is such that it is also well suited for filtering a multitude of other fluids ranging from freely flowing liquids like gasoline and water to those of relatively high viscosity such as maple syrup, honey and the like.

It is one of the objects of the present invention to provide an all-purpose strainer of new and unusual construction which is extremely simple in character, inexpensive to manufacture, and highly efficient and sanitary in operation.

Another object is to provide a novel form of fluid strainer which is especially well adapted for removing sediment and other impurities from milk.

In strainers of the type hitherto known, it has been customary to provide a container or bowl for the fluid to be strained, a straining membrane such as a filter disc or pad of cotton to cover the outlet from the container, and some means for positively supporting and fixing the disc or pad in place across the outlet, the fluid simply being poured into the container on top of the pad and flowing therethrough by gravity. Such devices are commonly known as drop sediment strainers. These strainers, however, are relatively slow and inefficient in operation, and require frequent replacement of the straining membranes because the latter become clogged up with sediment in a relatively short time. When it is attempted to increase the speed of straining with such a device by shaking the strainer, the weight of the fluid often ruptures or otherwise injures the filter pad so that at least some of the fluid escapes unstrained.

It is therefore a further object of this invention to provide a fluid strainer of improved construction which requires no positive support beneath the filtering membrane, and which will strain a fluid more rapidly and efficiently, and without manual handling of the strainer, than any of those of like character previously known to the art.

Still another object is to provide a device for straining or filtering fluids which includes new and unusual means for directing the fluid onto the filtering membrane and for maintaining substantial portions of the latter free from deposits of sediment throughout the straining operation, thereby avoiding the necessity for replacing the membrane as frequently as is required in other strainers now known.

A still further object is to embody in a fluid strainer novel means for limiting the weight of the fluid exerted on the filtering membrane to that of a relatively small portion of the capacity of the strainer bowl, and for causing the fluid above the membrane to flow thereover with a whirling motion.

Another object is to provide a strainer of the character described which consists of only a single part in addition to the bowl and straining membrane, which part may be manufactured and sold as a separate article of commerce for use with the bowls of various other forms of strainers available to the public.

These and other objects, including the provision of a strainer which can be readily cleaned and sterilized in accordance with the strictest health regulations, will appear more fully upon a consideration of the detailed description of the invention which follows. Although only three specific forms of strainer have been described and illustrated in the accompanying drawings, it is to be expressly understood that these drawings are for purposes of illustration only and is not to be construed as defining the scope of the invention, reference being had for this purpose to the appended claims.

Referring now to the drawings, wherein like reference characters indicate like parts throughout the several views:

Fig. 1 is a perspective view, with certain parts broken away, of one form of strainer embodying the present invention;

Fig. 2 is a sectional view through the axis of the strainer shown in Fig. 1;

Fig. 3 is a pulled-out perspective view of the element to be known as the strainer plunger, the straining membrane and a portion of the strainer bowl of the construction of Fig. 1;

Fig. 4 is a plan section taken substantially on line 4—4 of Fig. 2;

Figure 5:
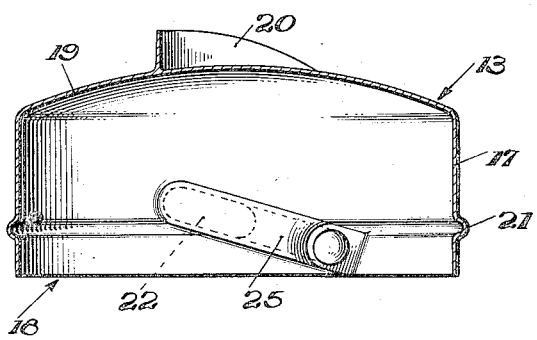
Fig. 5 is a sectional view of a modified form of strainer plunger.

As shown in the drawings, the preferred form of strainer embodying the present invention consists of only three parts—a container or bowl 11, a straining membrane or pad 12, and a member 13 which will hereinafter be referred to as the plunger.

The container 11 into which the fluid to be strained is delivered in any desired manner may be of any suitable size, shape and construction so long as it is provided with an outlet for the strained fluid through which the latter may be discharged after passing through the plunger 13 and straining membrane 12. In the form illustrated, a bowl 11 is provided with a substantially cylindrical body portion 14 open at the top and curving at the bottom as indicated at 15 to form an outlet 16 of circular cross section, the diameter of the outlet being substantially less than that of the body portion 14. When the strainer is intended to be used for filtering milk, the wall of outlet 16 may be suitably shaped to fit into the top of a milk can and thereby support the strainer assembly.

The strainer plunger 13 is an inverted, substantially cup-shaped member having a cylindrical wall 17, an open bottom end 18 and an upper end which is preferably, but not necessarily, closed by an imperforate top 19. The top 19 may have secured thereto in any suitable manner, as by welding, a handle 20 of any desired construction. The outside diameter of the lower end of wall 17 of plunger 13 is slightly smaller than the inside diameter of the upper portion of outlet 16 of the bowl 11 in order that the lower end of the plunger may be placed into the outlet with a frictional fit when the straining membrane 12 is placed across the open bottom end 18 with its periphery engaged and clamped between the outside surface of wall 17 and the inside surface of outlet 16. If desired, the lower end of the plunger wall may be slightly tapered or otherwise adapted to fit bowl outlets of different diameters. In order to prevent the plunger from being forced too far into outlet 16, the former may be provided with a peripheral bead 21 having an outside diameter greater than the inner diameter of the outlet. When used, bead 21 also serves to distend the periphery of straining membrane 12 as indicated in Figs. 2 and 4, and thereby assists in preventing the escape of any unstrained fluid into outlet 16.

Straining membrane or pad 12 may be made of any suitable material dependent upon the nature of the fluid being filtered, but is preferably of such strength that it will maintain its proper position during the straining operation without rupture or other injury, in spite of the fact that it has no positive support therebeneath but is held in place solely by reason of the fact that its periphery is clamped between the lower portion of wall 17 of plunger 13 and the inner surface of outlet 16. It has been found in straining milk that a disc or pad of unfinished cotton cloth provides a straining membrane of sufficient strength, and is sufficiently impervious to the substances to be filtered from the milk, to secure satisfactory results. In this connection, however, it should be noted that the gauze cotton and cotton batting strainer discs commonly used in known types of milk strainers are not suitable for use in the preferred form of strainer of the present invention because, in the absence of a positive support therebeneath, these filtering membranes are of insufficient strength to withstand the unusual action of the milk which is brought about by the novel construction of plunger 13 next to be described.

From the disclosure thus far set forth, it will be seen that, when plunger 13 is in place within the bowl 11 with the straining membrane or pad 12 held taut by frictional engagement of its periphery between the lower end of cylindrical wall 17 of the plunger and the inner surface of outlet 16, the plunger separates and encloses the space directly above the membrane from the rest of the space within the bowl and also prevents any of the fluid from passing directly from the interior of the bowl to the outlet 16. According to the invention, however, novel means are provided for passing fluid from the space within the bowl outside of plunger 13 into the interior of the latter and onto the straining membrane 12, said means being so constructed and arranged that the fluid delivered to the interior of the plunger is given a whirling motion therewithin on top of the straining membrane. Although it is obvious that various mechanical expedients may be utilized for effecting this result, Figs. 1–4 illustrate a simple construction which consists in the provision in cylindrical wall 17 of plunger 13 of one or more openings or ports 22 each of which communicates with the interior of the plunger by means of a tube-like member or nozzle 23, said members being formed integrally with or secured to the inner surface of wall 17 in such positions that their axes defining the direction of flow of the fluid therethrough are approximately tangent to the inner surface of said wall—that is, the fluid discharged therefrom strikes the inside of wall 17 at a relatively small angle so as to be deflected around the interior of the plunger with a whirling motion.

Figure 6:
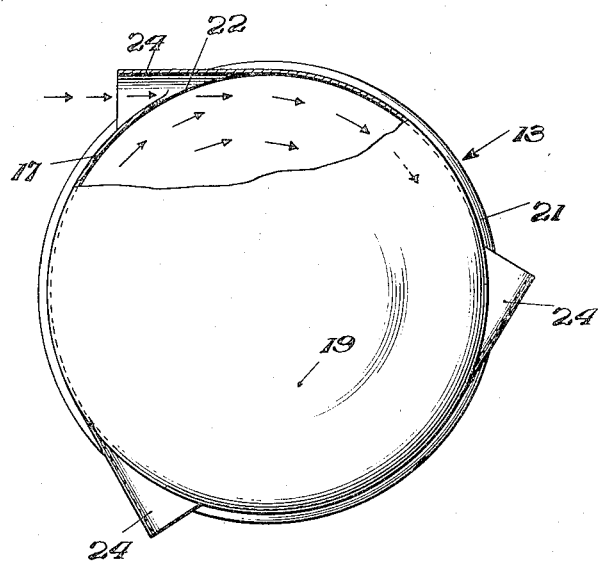
Fig. 6 is a plan view, partially in section, of still another form of strainer plunger embodying the invention.
Figure 7:
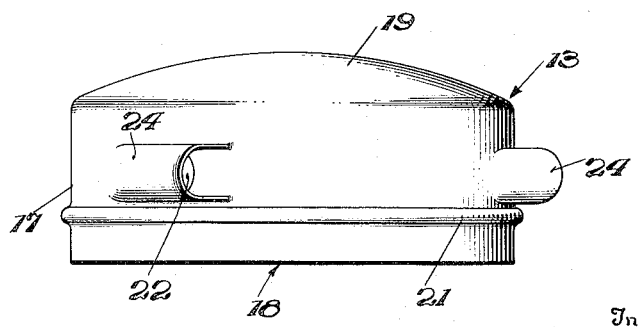
Fig. 7 is a side elevation of the plunger shown in Fig. 6.

Another form of plunger embodying the invention is shown in Figs. 6 and 7, this construction differing from that of Figs. 1–4 primarily in that the tube-like members or nozzles 24 are formed on the outside of wall 17 rather than on the inside thereof. This change in the location of the nozzles simplifies and decreases the cost of manufacture of the plunger, and also makes it somewhat easier to clean. Removal of the nozzles from the interior of the plunger also decreases the formation of eddies and other resistance to whirling movement of the fluid within the plunger and thereby tends to increase the speed of straining. The provision of three inlets to the plunger spaced 120° apart, as shown in Figs. 6 and 7, has also been found more desirable from a speed standpoint than the use of only two diametrically opposite inlets, while elimination of the handle from the top of the plunger results in a further simplification in structure and saving in cost of manufacture.

In the embodiments illustrated in Figs. 1–4, 6 and 7, the axes of the tube-like members or nozzles which direct the fluid into the plunger are substantially parallel to the plane of the open bottom end of the plunger across which the straining membrane is disposed, and are at a height just above bead 21 so as to effectively strain substantially all of the contents of the bowl. As is apparent from the drawings, this places the tube-like members relatively close to the open bottom end of the plunger. In this connection, it may be pointed out that the diameter of the straining membrane should be so proportioned that, when in place in the strainer, the edge thereof does not extend sufficiently high above bead 21 to obstruct the entrances to the ports or nozzles.

In these constructions, the discharge ends of tube-like members or nozzles are spaced above the plane of the straining membrane by a distance approximately equal to that from bead 21 to the lower edge of cylindrical wall 17 of the plunger. While this distance is relatively small, particularly in comparison with the height of the bowl, the embodiment of Figs. 1–4 may be modified, if desired, in the manner indicated in Fig. 5 so as to bring the outlet ends of the nozzles even closer to the straining membrane. As shown in this figure, the axes of members 25 are inclined downwardly toward the straining membrane or pad 12 so that the fluid discharged therefrom not only is given a whirling motion, by reason of its tangential flow relative to wall 17, but also impinges upon the pad in such a way as to effect a continuous washing thereof during the straining operation. A similar washing action has been observed, however, in the operation of strainers constructed in accordance with the showings of Figs. 1–4, 6 and 7.

In using the strainer of the present invention, the plunger, pad and bowl are first assembled and the bowl is positioned above whatever container is intended to receive the strained fluid. The fluid to be strained is then poured or otherwise delivered into the bowl, whereupon the straining operation takes place automatically. It is to be especially noted that it is entirely unnecessary—and in fact undesirable—to shake or otherwise manhandle the strainer of the present invention during straining, as is common practice with the drop sediment strainers now in general use. The present strainer will operate most efficiently and quickly if left in a fixed position. The fluid which is in the bowl outside of the plunger is forced through the openings in the plunger wall and into the interior thereof by gravity. In flowing through the tube-like members or nozzles communicating with the ports a definite velocity and direction of flow is imparted to the fluid, which direction is approximately tangent to the inner surface of the cylindrical wall of the plunger. The fluid discharged from the nozzles therefore impinges against the plunger wall at a relatively small angle and, due to its velocity, moves around the inside of the plunger and on top of the filtering membrane or pad with a whirling or swirling motion as indicated by the arrows in the drawings.

There is thus provided by the present invention a novel fluid strainer which is of extremely simple construction, rapid and efficient in operation, and economical in both first cost and operating expense, the principal element of which the so-called plunger, is particularly adapted for manufacture as a separate article of commerce in any desired size or in such other manner as to be capable of use with any strainer bowl or container which may be available.

It will be obvious that the invention is not limited to the particular apparatus shown in the drawings, but is capable of a variety of mechanical embodiments. For instance, the plunger may be used with any suitable form of container for the fluid to be strained other than that illustrated, and also with means for positively supporting the straining membrane in known manner, although such supporting means is not necessary if a filter pad of proper strength is used. Likewise, as has previously been pointed out, the strainer may be effectively used for filtering a wide variety of fluids. It should also be obvious that the specific arrangement of ports and tube-like members or nozzles which provide for the passage of the fluid into the plunger and produce the whirling motion of the fluid therewithin may be replaced by various other means which might be devised for performing the same functions. Furthermore, the number of ports and nozzles is immaterial to the invention, although the speed of straining will, of course, increase with an increase in the total cross section of the available entrances to the plunger so long as the rate of flow of the fluid into the plunger does not exceed its rate of flow through the straining membrane. It has also been found that a closed top for the plunger is not essential to the successful operation of the strainer, although it is true that the speed of filtering is greater when a covered plunger is used. Should it be desired to omit the top closure of the plunger, it is obvious that suitable precautions should be taken to avoid delivery of the fluid to be strained directly onto the straining membrane without first passing through the passageways in the wall of the plunger; for example, the plunger wall might be extended upwardly sufficiently high to prevent the undesired action. It is also to be expressly understood that the strainer plunger of the present invention is adapted for separate manufacture and can be used in place of the various filtering elements of a large number of the strainers now known to the art.

Various other changes, which will now become apparent to those skilled in the art, may be made in the form, details of construction and arrangement of the parts without departing from the spirit of the invention. Reference is therefore to be had to the appended claims for a definition of the limits of the invention.

This is a continuation in part of application Serial No. 43,620, filed October 4, 1935.

What is claimed is:

1. In a strainer for removing foreign or undesirable substances from a fluid, the combination of a container for the fluid to be strained, an outlet from said container through which the strained fluid is discharged, a straining membrane pervious to the fluid being strained but impervious to the substances to be removed therefrom disposed across said outlet, means separating the space above said membrane from the rest of the space within said container, and a plurality of passageways through said separating means so constructed and arranged that the fluid flowing therethrough from outside the separating means is directed onto said straining membrane with a whirling motion.

2. In a strainer for removing foreign or undesirable substances from a fluid, the combination of a container for the fluid to be strained, an outlet from said container circular in cross section through which the strained fluid is discharged, a straining membrane pervious to the fluid being strained but impervious to the substances to be removed therefrom disposed across said outlet, a substantially cylindrical wall separating the space above said membrane from the rest of the space within said container, and means opening through said wall for passing fluid from outside the latter onto said straining membrane, said last named means being so constructed and arranged that the fluid is discharged therefrom substantially tangentially to the inner surface of said wall and thereby given a whirling motion above said membrane.

3. In a strainer for removing foreign or undesirable substances from a fluid, the combination of a container for the fluid to be strained, an outlet from said container substantially circular in cross section through which the strained fluid is discharged, a straining membrane pervious to the fluid being strained but impervious to the substances to be removed therefrom disposed across said outlet, an inverted substantially cup-shaped member separating and enclosing the space above said membrane from the rest of the space within said container, and at least one port opening through the wall of said member for passing fluid from the space within said container outside of said member onto said straining membrane, said port being so constructed and arranged that the direction of flow therethrough is substantially tangential to the wall of said member.

4. A strainer for removing foreign or undesirable substances from a fluid comprising the combination of a bowl into which the fluid to be strained is placed, a substantially circular outlet from the bottom of said bowl through which the strained fluid is discharged, a cylindrical walled member having a closed top and an open bottom removably disposed within said bowl with its lower end having a frictional fit within said bowl outlet, a straining membrane pervious to the fluid being strained but impervious to the substances to be removed therefrom extending across the open bottom of said member and having its periphery clamped between the outer surface of the latter and the inner surface of the bowl outlet, said membrane being otherwise unsupported, a plurality of circumferentially spaced ports formed in the wall of said member, and a tube-like member communicating with each of said ports and adapted to direct the fluid into the space within said cylindrical walled member, the axis of each of said tube-like members making a relatively small angle with the portion of the inner surface of said wall against which the fluid passing therethrough is discharged.

5. A strainer for removing foreign or undesirable substances from a fluid comprising the combination of a container into which the fluid to be strained is delivered, a substantially circular outlet from the bottom of said container through which the strained fluid is discharged, a cylindrical walled member having an open bottom removably disposed within said container with its lower end adjacent said container outlet, a straining membrane pervious to the fluid being strained but impervious to the substances to be removed therefrom extending across the container outlet, at least one port formed in the wall of said member, and a tube-like member communicating with said port and adapted to direct the fluid into the space within said cylindrical walled member, the axis of said tube-like member being substantially parallel to the plane of said membrane and approximately tangent to the wall of said cylindrical walled member.

6. A strainer for removing foreign or undesirable substances from a fluid comprising the combination of a container into which the fluid to be strained is delivered, an outlet from said container through which the strained fluid is discharged, a walled member having at least one open end removably disposed within said container with its open end adjacent said container outlet, a straining membrane pervious to the fluid being strained but impervious to the substances to be removed therefrom extending across the container outlet, a plurality of ports formed in the wall of said member, and a nozzle member communicating with each of said ports and adapted to direct the fluid into the space within said walled member, said nozzle members being secured to the outside of the wall of said member with their axes so arranged that the fluid passing therethrough is discharged therefrom substantially tangentially to the inner surface of said wall and thereby given a whirling motion within said walled member.

7. As an article of manufacture, an element for use in a fluid strainer of the type including a container for the fluid to be strained having an outlet across which is disposed a straining membrane, comprising a walled member having a closed top and an open bottom adapted to be removably disposed within said container with its bottom end adjacent the container outlet, and means for passing fluid through the wall and into the interior of said member, said means including at least one passageway through said wall positioned relatively close to the open bottom end of said member and so constructed and arranged that the fluid discharged therefrom is given a whirling motion within said member.

8. As an article of manufacture, an element for use in a fluid strainer of the type including a container for the fluid to be strained having an outlet across which is disposed a straining membrane, comprising a substantially cylindrical walled member having a closed top and an open bottom adapted to be removably disposed within said container with its bottom end adjacent the container outlet, and at least one tube-like passageway positioned relatively close to the open bottom end of said member and opening through the cylindrical wall of said member to admit fluid to the interior thereof, the axis of said tube-like passageway being approximately tangent to said wall.

9. As an article of manufacture, an element for use in a fluid strainer of the type including a container for the fluid to be strained having an outlet across which is disposed a straining membrane, comprising a substantially cylindrical walled member having at least one open end adapted to be removably disposed within said container, the diameter of said open end being such as to have a frictional fit with the outlet of the container with the periphery of the straining membrane clamped therebetween when said member is disposed in operative position within said container, and at least one passageway opening through the cylindrical wall of said member to admit fluid to the interior thereof, said passageway being so constructed and arranged that the fluid is discharged therefrom against the inner surface of said wall in such a direction that it is given a whirling motion within said member.

10. As an article of manufacture, an element for use in a fluid strainer of the type including a container for the fluid to be strained having an outlet across which is disposed a straining membrane, comprising a substantially cylindrical walled member having one closed and one open end adapted to be removably disposed within said container, the diameter of said open end being such as to have a frictional fit with the outlet of the container with the periphery of the straining membrane clamped therebetween when said member is disposed in operative position within said container, a plurality of circumferentially spaced ports formed in the wall of said member, and a tube-like member communicating with each of said ports, the axis of each of said tube-like members making a relatively small angle with the portion of the inner surface of said wall against which the fluid passing therethrough is discharged.

11. As an article of manufacture, an element for use in a fluid strainer of the type including a container for the fluid to be strained having an outlet across which is disposed a straining membrane, comprising a substantially cylindrical walled member having at least one open end adapted to be removably disposed within said container with said open end adjacent the container outlet, and at least one tube-like passageway opening through the cylindrical wall of said member to admit fluid to the interior thereof, the axis of said tube-like passageway being inclined with respect to the plane of the open end of said member and so disposed that the fluid discharged from said passageway is given a whirling motion within said member.

12. As an article of manufacture, an element for use in a fluid strainer of the type including a container for the fluid to be strained having an outlet across which is disposed a straining membrane, comprising a substantially cylindrical walled member having one closed and one open end, a plurality of circumferentially spaced ports formed in the wall of said member, and a nozzle member communicating with each of said ports, said nozzle members being secured to the outside of said wall with their axes so arranged that the fluid discharged therefrom is given a whirling motion within said walled member.

ARTHUR C. FLAVIN.
THOMAS M. FLAVIN.
WILLIAM B. FLAVIN.